United States Patent
Soares et al.

(10) Patent No.: US 11,520,830 B2
(45) Date of Patent: Dec. 6, 2022

(54) SEMANTIC QUERIES BASED ON SEMANTIC REPRESENTATION OF PROGRAMS AND DATA SOURCE ONTOLOGIES

(71) Applicant: International Business Machines Corporation, Armonk, NY (US)

(72) Inventors: Ioana Monica Baldini Soares, Larchmont, NY (US); Evan Patterson, Los Altos, CA (US); Kush Raj Varshney, Ossining, NY (US); Aleksandra Mojsilovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 16/244,447

(22) Filed: Jan. 10, 2019

(65) Prior Publication Data
US 2020/0226181 A1 Jul. 16, 2020

(51) Int. Cl.
*G06F 16/903* (2019.01)
*G06F 16/901* (2019.01)

(52) U.S. Cl.
CPC .... *G06F 16/90335* (2019.01); *G06F 16/9024* (2019.01)

(58) Field of Classification Search
CPC .......... G06F 16/90335; G06F 16/9024; G06F 16/367; G06F 16/3344; G06F 8/20; G05B 2219/32043
See application file for complete search history.

(56) References Cited

U.S. PATENT DOCUMENTS

| 8,429,179 B1* | 4/2013 | Mirhaji ................. G06F 16/248 707/756 |
| 8,983,989 B2 | 3/2015 | Srikanth et al. |
| 2007/0050343 A1* | 3/2007 | Siddaramappa ........ G06F 16/80 |
| 2016/0041847 A1* | 2/2016 | Fang ........................ G06F 9/52 718/103 |

(Continued)

FOREIGN PATENT DOCUMENTS

WO WO-2015019364 A2 * 2/2015 ....... G06F 17/30958

OTHER PUBLICATIONS

Patterson et al., "Teaching Machines to Understand Data Science Code by Semantic Enrichment of Dataflow Graphs," arXiv:1807.05691v1 [cs.AI], Jul. 16, 2018, 8 pages.

(Continued)

*Primary Examiner* — Usmaan Saeed
*Assistant Examiner* — William P Bartlett
(74) *Attorney, Agent, or Firm* — Amin, Turocy & Watson, LLP

(57) ABSTRACT

Techniques for generating and searching semantic flow graphs are provided that include creating, by a system operatively coupled to a processor employing a semantic flow graph creation process, a semantic flow graph based on an ontology associated with a set of subjects and a raw flow graph determined from an analysis of a data set relating to the set of subjects and searching, by the system, the semantic flow graph to determine a subset of information of the semantic flow graph that is responsive to a query based on the query and information of the semantic flow graph.

20 Claims, 10 Drawing Sheets

(56) References Cited

U.S. PATENT DOCUMENTS

| | | | |
|---|---|---|---|
| 2016/0170859 A1* | 6/2016 | Bucuvalas | G06F 8/433 717/132 |
| 2016/0306852 A1 | 10/2016 | Guggilla et al. | |
| 2017/0103143 A1* | 4/2017 | Kumar | G06F 16/9024 |
| 2017/0124158 A1 | 5/2017 | Mirhaji | |
| 2017/0147635 A1* | 5/2017 | McAteer | G06F 16/2246 |
| 2018/0189388 A1* | 7/2018 | Baldini Soares ... | G06F 16/9024 |
| 2018/0189389 A1* | 7/2018 | Baldini Soares ... | G06F 16/9024 |
| 2020/0125732 A1* | 4/2020 | Iyer | G06F 8/33 |

OTHER PUBLICATIONS

Soares Baldini, Ioana Monica, et al. "Generating Semantic Flow Graphs Representing Computer Programs." U.S. Appl. No. 16/021,080, filed Jun. 28, 2018. 35 pages.
"Disease Ontology." http://disease-ontology.org/. Last Accessed Nov. 15, 2018. 1 page.
Barr, Michael, et al. "Category Theory for Computing Science." Prentice Hall. 1990. 558 pages.
Allamanis, Miltiadis, et al. "A Survey of Machine Learning for Big Code and Naturalness." arXiv:1709.06182v2 [cs.SE] May 5, 2018. 36 pages.
Arp, Robert, et al. "Building Ontologies with Basic Formal Ontology." MIT Press, 2015. 245 pages.
Awodey, Steve. "Category Theory." Clarendon Press, 2006. 266 pages.
Baader, Franz, et al. "The Description Logic Handbook: Theory, implementation, and applications." Cambridge University Press. 2007. 510 pages.
Baader, Franz, et al.. "Term rewriting and all that." Cambridge University Press. 1998. 313 pages.
Goodman, Steven, N., et al. "What does research reproducibility mean?." ScienceTranslationalMedicine. Jun. 1, 2016, Vo.l 8, Issue 341. 7 pages.
Ben-Nun, Tal, et al. "Neural Code Comprehension: A Learnable Representation of Code Semantics." arXiv:1806.07336v2 [cs.LG] Jul. 31, 2018. 13 pages.
Cartmell, J.W. "Generalised algebraic theories and contextual categories." Oxford University, 1978. 218 pages.
Cartmell, John. "Generalised algebraic theories and contextual categories." Annals of Pure and Applied Logic 32 (1986) 209-243. 35 pages.
"The digital mammography DREAM challenge." https://www.synapse.org/#!Synapse:syn4224222/wiki/401743. Last Accessed Nov. 5, 2018.
Gurevitch, Jessica, et al. "Meta-analysis and the science of research synthesis." Nature, vol. 555, Mar. 8, 2018. 8 pages.
Guth, Dwight. "A Formal Semantics of Python 3.3." University of Illinois at Urbana-Champaign, 2013 53 pages.
Macdonald, John, et al. "Amalgamations of Categories." Canad. Math. Bull. vol. 52 (2), 2009 pp. 273-284. 12 pages.
Leinster, T. "Basic Category Theory." Cambridge University Press. 2014. 176 pages.
Hasegawa, Masahito. "Recursion from Cyclic Sharing: Traced Monoidal Categories and Models of Cyclic Lambda Calculi." Proc 3rd International Conference on Typed Lambda Calculi and Applications. 1997. 18 pages.
Hasegawa, Masahito. "The Uniformity Principle on Traced Monoidal Categories." Electronic Notes in Theoretical Computer Science 69 (2003). 19 pages.
Hey, Tony, et al. "The fourth paradigm: Data-intensive scientific discovery." Microsoft Research 2009. 287 pages.
Jeffrey, A. "Premonoidal categories and a graphical view of programs." University of Sussex, School of Cognitive and Computing Sciences, 1997. 37 pages.

Kelly, G.M. "Basic Concepts of Enriched Category Theory." Reprints in Theory and Applications of Categories, No. 10, 2005. Originally published by Cambridge University Press, London Mathematical Society Lecture Notes Series 64, 1982. 143 pages.
Kueffner, Robert, et al. "Stratification of amyotrophic lateral sclerosis patients: A crowdsourcing approach." http://dx.doi.org/10.1101/294231. Apr. 5, 2018. 36 pages.
Marek, K., et al. "The Parkinson Progression Marker Initiative (PPMI)." Progress in Neurobiology 95 (2011) 629-635. 7 pages.
Marsden, Dan. "Ambiguity and Incomplete Information in Categorical Models of Language." Quantum Physics and Logic (QPL) 2016 (pp. 95-107). 13 pages.
Monti, Stefano, et al. "Consensus clustering: A resampling based method for class discovery and visualization of gene expression microarray data." Machine Learning, 52 (1), 91-118.(2003). 28 pages.
Morandat, F., et al. "Evaluating the design of the R language: Objects and functions for data analysis." In European conference on object oriented programming (pp. 104-131). 2012. 28 pages.
Pashler, Harold, et al. "Editors' introduction to the special section on replicability in psychological science: A crisis of confidence?" Perspectives on Psychological Science, 7 (6), 528-530. 4 pages.
Patterson, Evan, et al. "Semantic representation of data science programs." Proceedings of the Twenty-Seventh International Joint Conference on Artificial Intelligence (IJCAI-18) (pp. 5847-5849). doi:10.24963/ijcai.2018/ 858. 2018. 3 pages.
Piwowar, et al. "The state of OA: A large-scale analysis of the prevalence and impact of Open Access articles." PeerJ, 6, e4375. 2018. 35 pages.
Power, Johng, et al. "Premonoidal categories and notions of computation." Mathematical Structures in Computer Science, 7 (5), 453-468. 17 pages.
Riehl, E. "Categorical Homotopy Theory." Cambridge University Press. 2014. 372 pages.
Riehl, E. "Category theory in context." Dover. 2016. 258 pages.
Selinger, Peter. "Categorical Structure of Asynchrony." Electronic Notes in Theoretical Computer Science 20 (1999). 23 pages.
Spivak, David. "Category theory for the sciences." MIT Press. 2017. 495 pages.
Stolovitzky, Gustavo, et al. "Dialogue on Reverse-Engineering Assessment and Methods." Ann. N.Y. Acad. Sci. 1115: 1-22 (2007). 22 pages.
Wilkinson, Mark D., et al. "The FAIR Guiding Principles for scientific data management and stewardship." Scientific Data. 2016. 9 pages.
Goguen, Joseph A. "Order-sorted algebra I: Equational deduction for multiple inheritance, overloading, exceptions and partial operations." Theoretical Computer Science 105 (1992) 2 I7-273. 57 pages.
Hey, Tony, et al. "The Fourth Paradigm: Data-intensive Scientific Discovery." Microsoft Research. 2009. 284 pages.
Heunen, Chris, et al. "Lectures on Categorical Quantum Mechanics." Computer Science Department, Oxford University. 2012. https://www.cs.ox.ac.uk/files/4551/cqm-notes.pdf. 104 pages.
Wickham, Hadley, et al. "Advanced R." Chapman & Hall/CRC the R Series, http://adv-r.had.co.nz/. 2012. 431 pages.
Patterson, E., et al. "datascienceontology." https://github.com/ibm/datascienceontology. Last Accessed Nov. 15, 2018. 1 page.
Patterson, E., et al. "pyflowgraph." https://github.com/ibm/pyflowgraph. Last Accessed Nov. 15, 2018. 1 page.
Patterson, E., et al. "rflowgraph." https://github.com/ibm/rflowgraph. Last Accessed Nov. 15, 2018. 1 page.
Patterson, E., et al. "semanticflowgraph." https://github.com/ibm/semanticflowgraph. Last Accessed Nov. 15, 2018. 2 pages.

* cited by examiner

SEMANTIC QUERIES BASED ON SEMANTIC REPRESENTATION OF PROGRAMS AND DATA SOURCE ONTOLOGIES

BACKGROUND

The subject disclosure relates to computer programming and, more specifically, to generating and searching semantic flow graphs representing computer programs and the source data upon which computer programs operate.

SUMMARY

The following presents a summary to provide a basic understanding of one or more embodiments described herein. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating generating and searching semantic flow graphs are described.

According to an embodiment, a system can comprise a memory that stores computer-executable components and a processor, operatively coupled to the memory, that executes the computer-executable components, the computer-executable components generating a graph component that employs a semantic flow graph creation process to create a semantic flow graph based on an ontology associated with a set of subjects and a raw flow graph determined from an analysis of a data set relating to the set of subjects. The computer-executable components also generate a query component that searches the semantic flow graph to determine a subset of information of the semantic flow graph that is responsive to a query based on the query and information of the semantic flow graph. In an aspect, the determined subset of the semantic flow graph responsive to the query can provide results to the query with improved accuracy, usefulness and performance.

According to another embodiment, a computer-implemented method is provided. The computer-implemented method can comprise creating, by a system operatively coupled to a processor employing a semantic flow graph creation process, a semantic flow graph based on an ontology associated with a set of subjects and a raw flow graph determined from an analysis of a data set relating to the set of subjects and searching, by the system, the semantic flow graph to determine a subset of information of the semantic flow graph that is responsive to a query based on the query and information of the semantic flow graph. In an aspect, the determined subset of the semantic flow graph responsive to the query can provide results to the query with improved accuracy, usefulness and performance.

According to yet another embodiment, a computer program product that facilitates semantic querying, the computer program product comprising a computer readable storage medium having program instructions embodied therewith, the program instructions being executable by a processor to cause the processor to: create, by employing a semantic flow graph creation process, a semantic flow graph based on an ontology associated with a set of subjects and a raw flow graph determined from an analysis of a data set relating to the set of subjects and search the semantic flow graph to determine a subset of information of the semantic flow graph that is responsive to a query based on the query and information of the semantic flow graph. In an aspect, the determined subset of the semantic flow graph responsive to the query can provide results to the query with improved accuracy, usefulness and performance.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of one or more embodiments.

In computing, a program can be a specific set of ordered operations for a computer to perform. Some computer programs have commands that input and output source data. Typically, the program is a set of instructions put into a storage area accessible to the computer. The storage area or memory can also contain program source data on which the instructions operate. A computer program includes source code, which is usually written by a computer programmer in a programming language. From the source code, a compiler can derive machine code, which consists of instructions that the computer can directly execute.

When computers execute programs, computers only interpret program code at an instruction level, not at a higher conceptual level. Additionally, when the program source data upon which a computer program operates is considered, an extra level of conceptual complexity is added, i.e., while computers execute instructions to manipulate specific instances of specifically defined entities, the concepts underlying these entities and the broader conceptual connections between entities manipulated by program code are not readily apparent.

Figure 1:
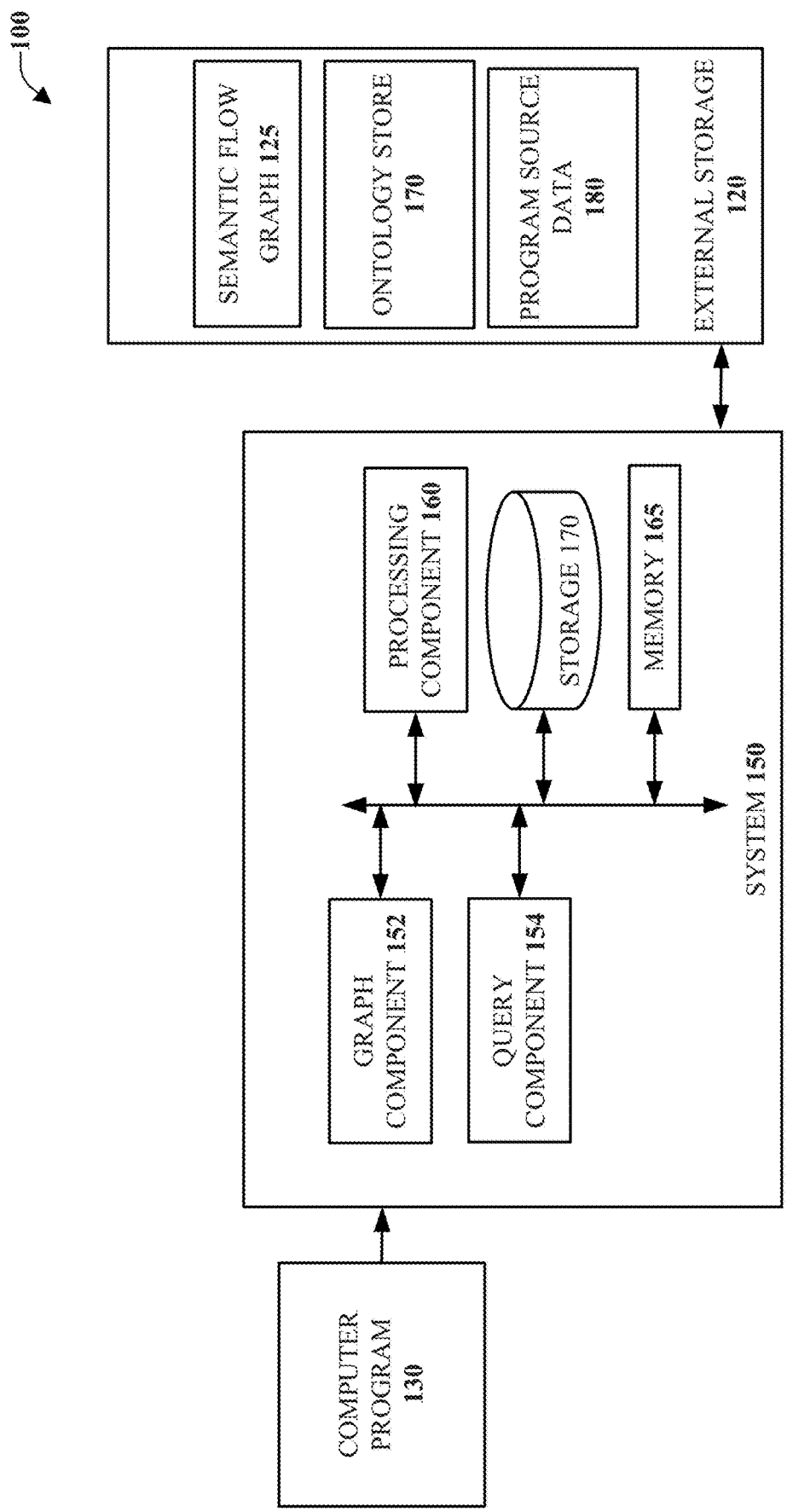
FIG. 1 illustrates a block diagram of an example, non-limiting system facilitating generating and searching semantic flow graphs generated from a computer program and based on a data science and a program data source ontology in accordance with one or more embodiments described herein.

FIG. 1 illustrates a block diagram 100 of an example, non-limiting system 150 that is an enrichment system that can form semantic representations both of the task structure of a computer program 130 and the program source data 180 upon which the computer program 130 operates. It should be noted that, when describing data associated with a computer program, the term 'computer source data' or 'source data' is used herein, but this data can both be source data (i.e., input to a computer program) and results data (i.e., output from a computer program). As discussed further herein, computer program operations that operate to input and output data, as well as the data itself, can be considered to be program source data 130 and can be analyzed by one or more embodiments.

As shown in FIG. 1, system 150 can include graph component 152 that can facilitate the generation of semantic representations of computer program 130 and program source data 180, e.g., semantic flow graph 125 depicted as stored in external storage 120. In one or more embodiments, the creation of semantic flow graph 125 can be based on both data science and program source data ontologies stored in ontology store 170. In one or more embodiments, ontology store 170 can store and can provide for use one or more ontologies, each of which can be specific to one or more subject matter domains of program source data 180 (termed "program source data ontologies" herein) and can also be specific to data science concepts embodied by the instructions of computer program 130 (termed a "data science ontology" herein). As used generally herein, an ontology is a formal naming and definition of the types, properties, and interrelationships of entities that exist in a subject matter domain, or domain of discourse. It should be noted that when one or more embodiments described herein reference generating or determining semantic flow graphs, this is equivalent to creating the semantic flow graphs.

Generally speaking, for one or more embodiments described herein, a semantic flow graph is a semantic representation of the analysis that operates on a data set. As discussed further with FIGS. 2 and 3 below, in one or more embodiments of system 150 the process of creating semantic flow graph 125 can begin with the transformation of computer program 130 into a raw flow diagram. The raw flow diagram can be transformed into a semantic flow graph 125 by the ontologies of ontology store 170. It should be noted that, as discussed herein, the process of transforming a raw flow diagram into a semantic flow graph can be termed "enriching" the raw flow graph, thus semantic flow graph 125 can also be referred to herein as an enriched flow diagram.

As discussed further with FIG. 6 below, system 150 is also depicted as including query component 154 that can facilitate semantic queries of one or more semantic flow graphs, including the created semantic flow graph 125. It should be noted that the one or more flow graphs that can be subject to semantic queries described herein can be created based on one or more semantic flow graph creation processes, including processes that are different from those described herein.

It should be noted that any examples discussed herein showing multiple computer systems (e.g., system 150 and external storage 120) are only shown this way for convenience, and any computer implementations of processing and storage can be used for embodiments. To facilitate processing, results can be stored and provided to a storage, e.g., storage 170. For processor executable components, system 150 can access memory 165 and storage 170, these respectively can be, for example, Random Access Memory (RAM) and a hard drive. In one or more embodiments, processing component 160 can receive executable instructions from memory 165 and storage 170 and can execute functional components, such as 152 and 154 discussed above. Ontology store 170 can be, for example, a database or one or more files used to maintain one or more established ontologies. Components, (e.g., graph component 152 and query component 154) can be implemented with software, hardware, or a combination of both. For instance, in one or more embodiments graph component 152 and query component 154 can be one or more software modules or one or more specialized hardware circuits, or a combination thereof.

System 150 and other embodiments discussed herein can employ hardware and/or software to solve problems that are highly technical in nature, including generating and searching a semantic flow of a program with program source data. Solutions described herein are not abstract and that cannot be performed as a set of mental acts by a human. Further, in certain embodiments, some of the processes performed can be performed by one or more specialized computers (e.g., one or more specialized processing units, a specialized computer for data storage, statistical estimation, and so on) for carrying out defined tasks related to machine learning. System 150 and/or components of system 150 can be employed to solve new problems that arise through advancements in technologies mentioned above, computer architecture, and/or the like. In some embodiments, by analyzing the structure and program source data of programs executed by a computer, system 150 can also provide technical improvements to a computer by improving processing performance of processing component 160 and/or improving power efficiency of processing component 160, e.g., by identifying more efficient approaches to executing programs.

Figure 2:
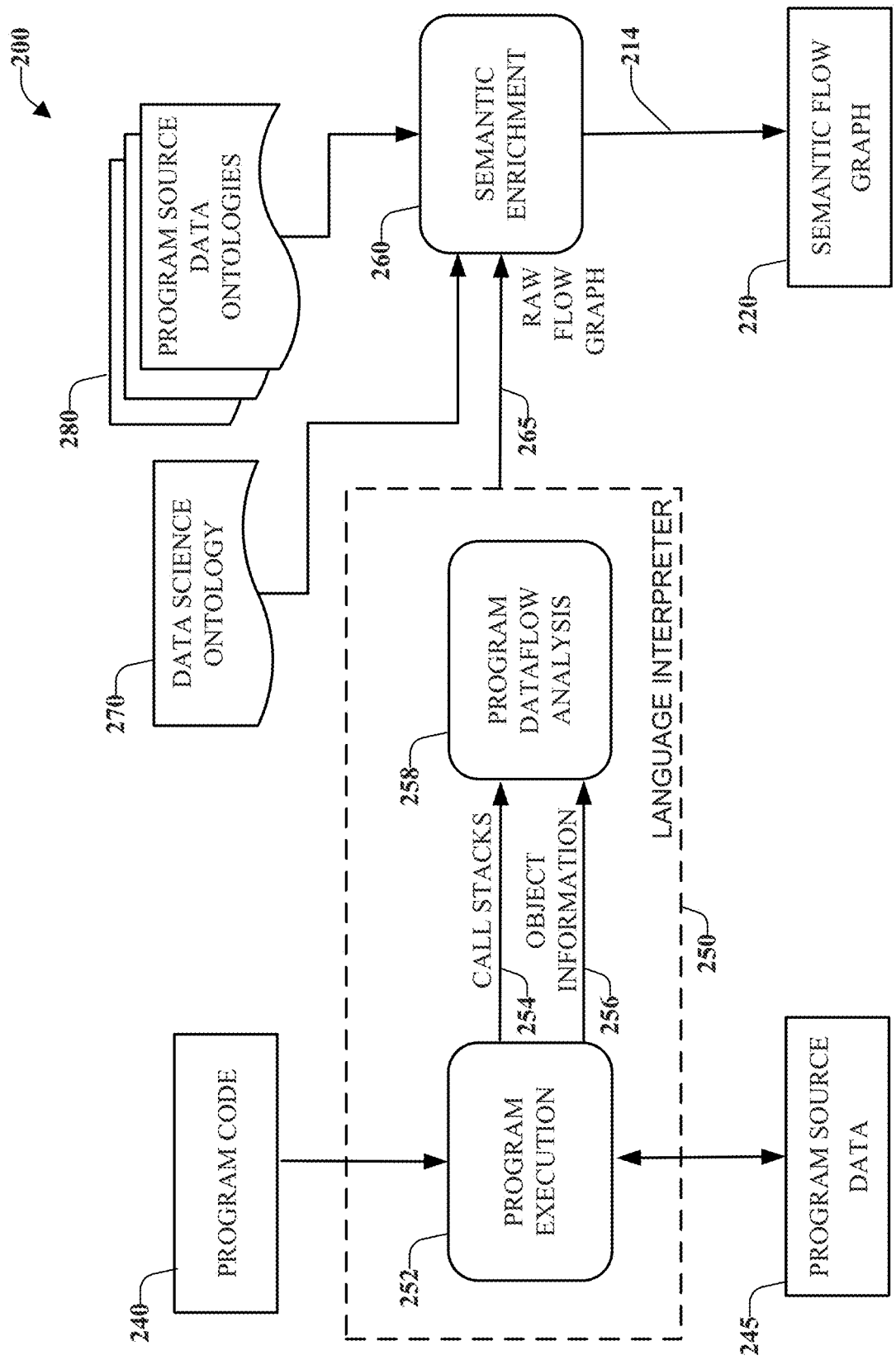
FIG. 2 illustrates a block diagram of an example, non-limiting system facilitating generating a semantic flow graph based on a data science and a program data source ontology in accordance with one or more embodiments described herein.

FIG. 2 illustrates a block diagram of an example, non-limiting semantic enrichment system 200 that can facilitate generation of semantic flow graph 220 from raw flow graph 265 based on data science ontology 270 and program data source ontologies 280 in accordance with one or more embodiments described herein. Repetitive description of like elements employed in other embodiments described herein is omitted for sake of brevity.

In this example, language interpreter 250 can receive program code 240 that can be interpreted and/or executed by program execution 252 process and program dataflow analysis 258 process. In addition, during program execution 252, language interpreter 250 can receive input and relay output to program source data 245. To facilitate program dataflow analysis 258, call stacks 254 and object information is 256 can be transferred from program execution 252 process to program dataflow analysis 258 process. One or more embodiments of program dataflow analysis 258 process can generate raw flow graph 265 of program code 240 as well as identify data subjects of program source data 245 operated on (input and output) by program code 240.

The process of semantic enrichment, which can be performed by semantic enrichment 260 process, can transform raw flow graph 265 into semantic flow graph 220, which describes program code 240 in semantic terms. Semantic enrichment can utilize program data source ontologies 280 applicable to a specific subject matter domain.

With reference to the generation of semantic flow graph 220, more specifically, enrichment system 200 in accordance with aspects of one or more embodiments can use semantic enrichment 260 process to receive raw flow graph 265 from language interpreter 250. Based on the content of raw flow graph 265, semantic enrichment 260 process can select and access data science ontology 270 to expand instruction parts of raw flow graph 265 with semantic equivalents. Additionally, semantic enrichment 260 process can select and access one or more of program source data ontologies 280 in the subject matter domain of the program to expand subject matter parts of raw flow graph 265 with semantic equivalents. In some embodiments, parts of raw flow graph 265 without known semantic equivalents can be collapsed into smaller parts, representing unknown functions or program source data 245 concepts.

In one or more embodiments, both raw flow graph 265 and semantic flow graph 220 can capture the execution of program code 240, but these two graphs generally can do so at different levels of abstraction. Raw flow graph 265, for example, can record concrete function calls made by the program code 240, and can be both language and library dependent. In contrast, in one or more embodiments, semantic flow graph 220 can be language and library independent, and can describe the operations of program code 240 in terms of abstract concepts specified by data science ontology 270.

According to one or more embodiments, data science ontology 270 can include two kinds of entities: concepts and annotations. In the subject matter domain of data science for instance, concepts can formalize abstract concepts of machine learning, statistics, and data computing. In one or more embodiments, semantic flow graph 220 can have nodes and edges linked to concepts, and as such, semantic flow graph 220 can have semantic content. Further, according to one or more embodiments, annotations from data science ontology 270 identify functions in raw flow graph 265. In one or more embodiments, as will be described further below, during semantic enrichment concrete functions in raw flow graph 265 are transformed into abstract functions in semantic flow graph 220.

According to one or more embodiments, concepts can formalize the abstract ideas of the subject matter domain of ontologies discussed herein. Concepts can also constitute the basic types and basic functions from which more complex types and functions are considered.

Annotations can describe how instantiation occurs by mapping the types and functions defined by these software packages onto the types and functions of the ontologies discussed herein. To avoid confusion between levels of abstraction, "types" identified in raw flow graph 265 are referred to herein as "concrete types" while types of ontologies are referred to herein as abstract types. Thus, a type annotation can map a concrete type (i.e., a primitive type or user-defined class in a programming language) onto an abstract type (i.e., a type concept in the ontology). Analogously, a function annotation can map a concrete function onto an abstract function. In one or more embodiments, in a broad sense, concrete functions include any programming language construct that does something, such as an ordinary function, methods of classes, attribute getters, attribute setters, etc. The modeling flexibility of one or more embodiments is useful to accurately translate diverse application programming interfaces, such as those used in statistical software, into a single set of universal concepts.

As discussed further below with the description of FIGS. 4 and 5, the result of the enrichment processes of one or more embodiments can be semantic flow graph 220 that conceptually describes the program execution of program code 240 as well as subject matter of the program source data 245 of program code 240. Examples of semantic flow graphs 220 based on data science ontology 270 and program source data ontologies 280 are described below with FIGS. 4 and 5 and associated descriptions. Detailed discussion and examples of the generation of semantic flow graph 220 from program code 240, program source data 245, data science ontology 270, and program source data ontologies 280 are discussed with FIG. 3 below.

Figure 3:
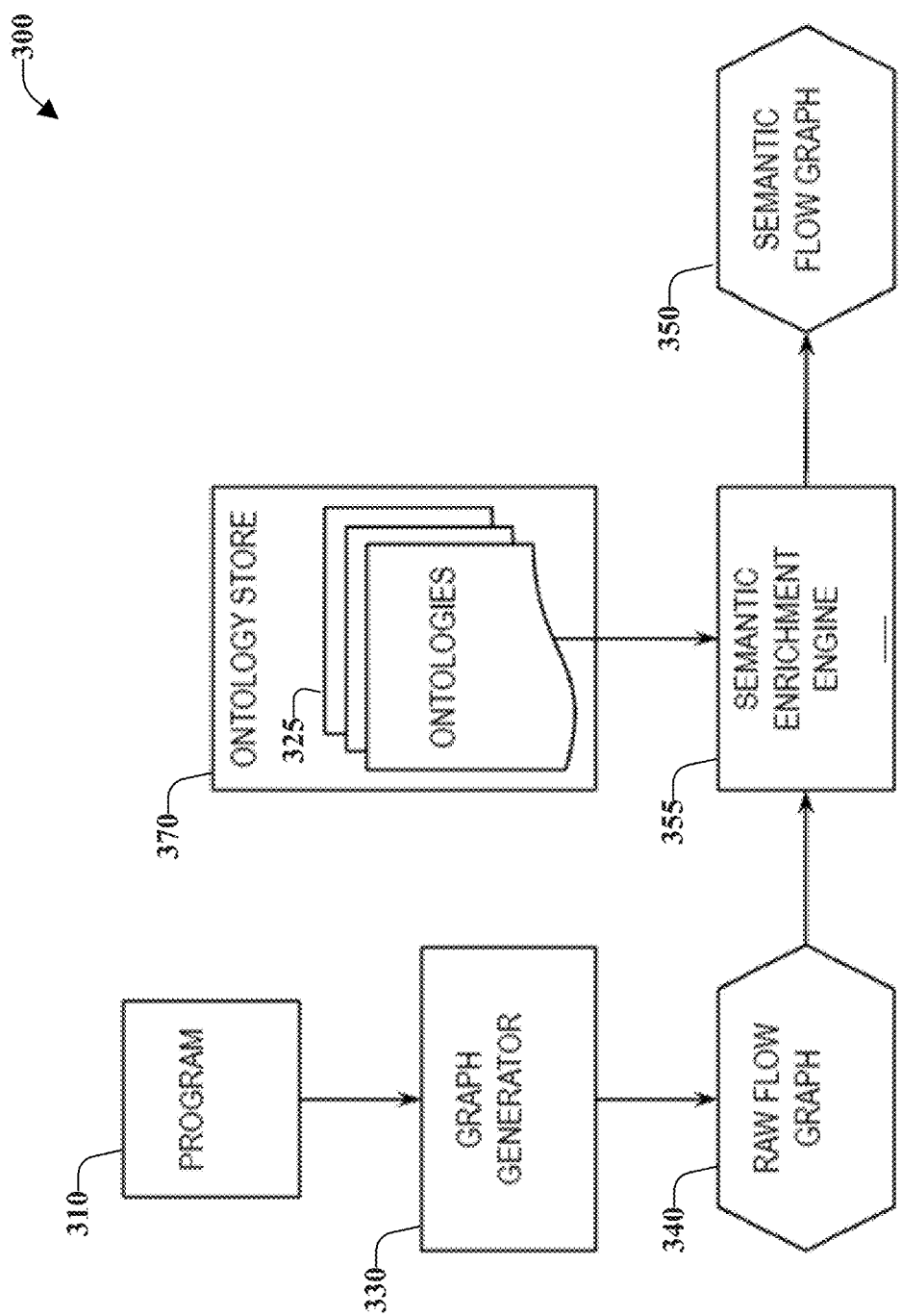
FIG. 3 is an architecture diagram of an example, non-limiting system facilitating generating a semantic flow graph based on a data science and a program data source ontology in accordance with one or more embodiments described herein.

FIG. 3 is a flow diagram of an example, non-limiting system 300 of generating semantic flow graph 350 from program 310 and ontologies 325 in ontology store 370, system 300 including graph generator 330 to facilitate the generating of raw flow graph 340, ontology store 370 having ontologies 325, and semantic enrichment engine 355 generating semantic flow graph 350 by transforming (enriching) raw flow graph 340. Repetitive description of like elements employed in other embodiments described herein is omitted for sake of brevity.

According to one or more embodiments, raw flow graph 340 of system 300 can be a dataflow graph representation of program 310. In one or more embodiments, raw flow graphs can be extracted from program 310 using static and dynamic program analysis, e.g., by recording a sequence of concrete function calls made by the execution of program 310. For example, in one or more embodiments, an execution of program 310 can be monitored (either used in a production, or in a test system), and actual data and function calls (e.g., call stacks 254 and object information of FIG. 2) can be used to generate the raw flow graph 340, i.e., system 300 can transform an inter-procedural data flow of program execution into raw flow graph 340. Also, in one or more embodiments, raw flow graph 340 can be generated by analyzing the code of program 310, without executing the program.

In one or more embodiments, once raw flow graph 340 is generated, a data science ontology can be selected from ontologies 325 by semantic enrichment engine 355. It should be noted that this selected data science ontology can be selected based on the types of operations in program 310 (e.g., in the example shown in FIG. 4, statistical operations), and multiple data science ontologies can also be selected to cover a variety of operations if needed, e.g., an ontology for programmatic statistical analysis can be selected in addition to a data science ontology for functions associated with the graphical displays of data.

Figure 4:
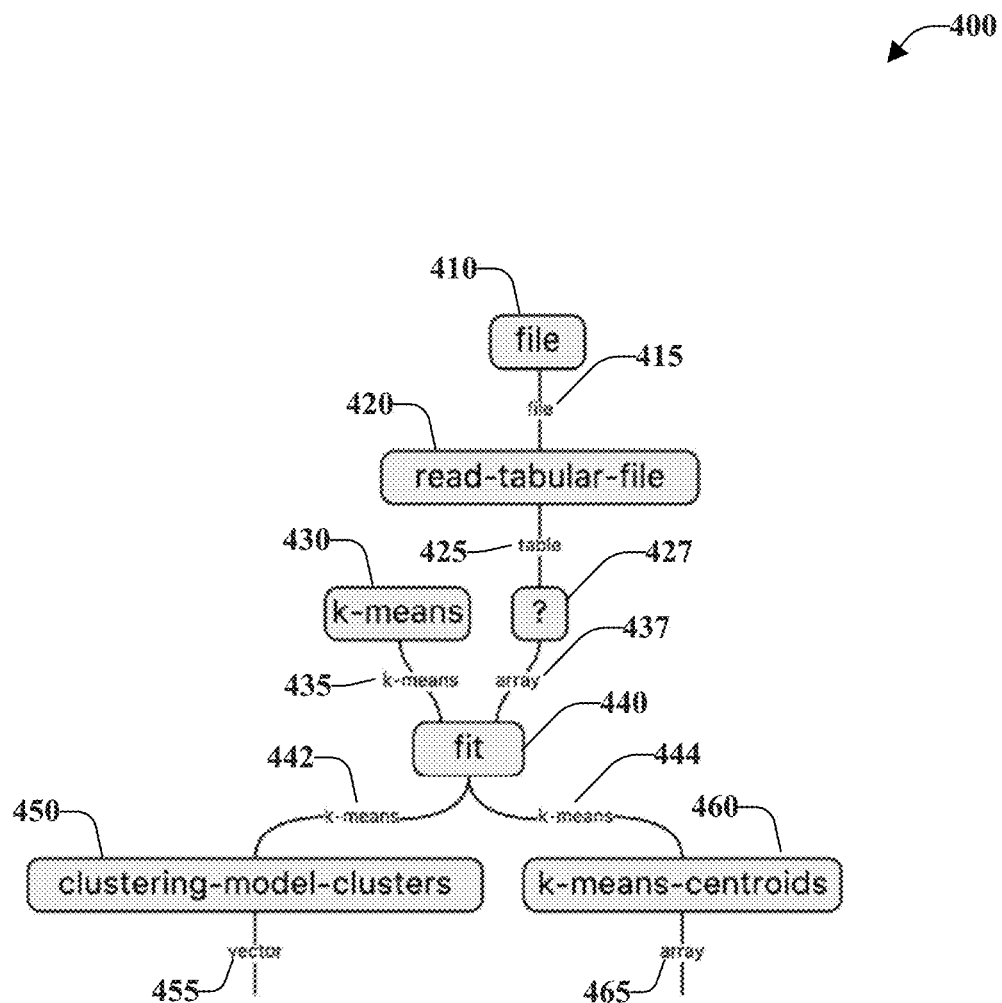
FIG. 4 is an example semantic flow graph of a program, generated based on a data-science ontology in accordance with one or more embodiments described herein.
Figure 5:
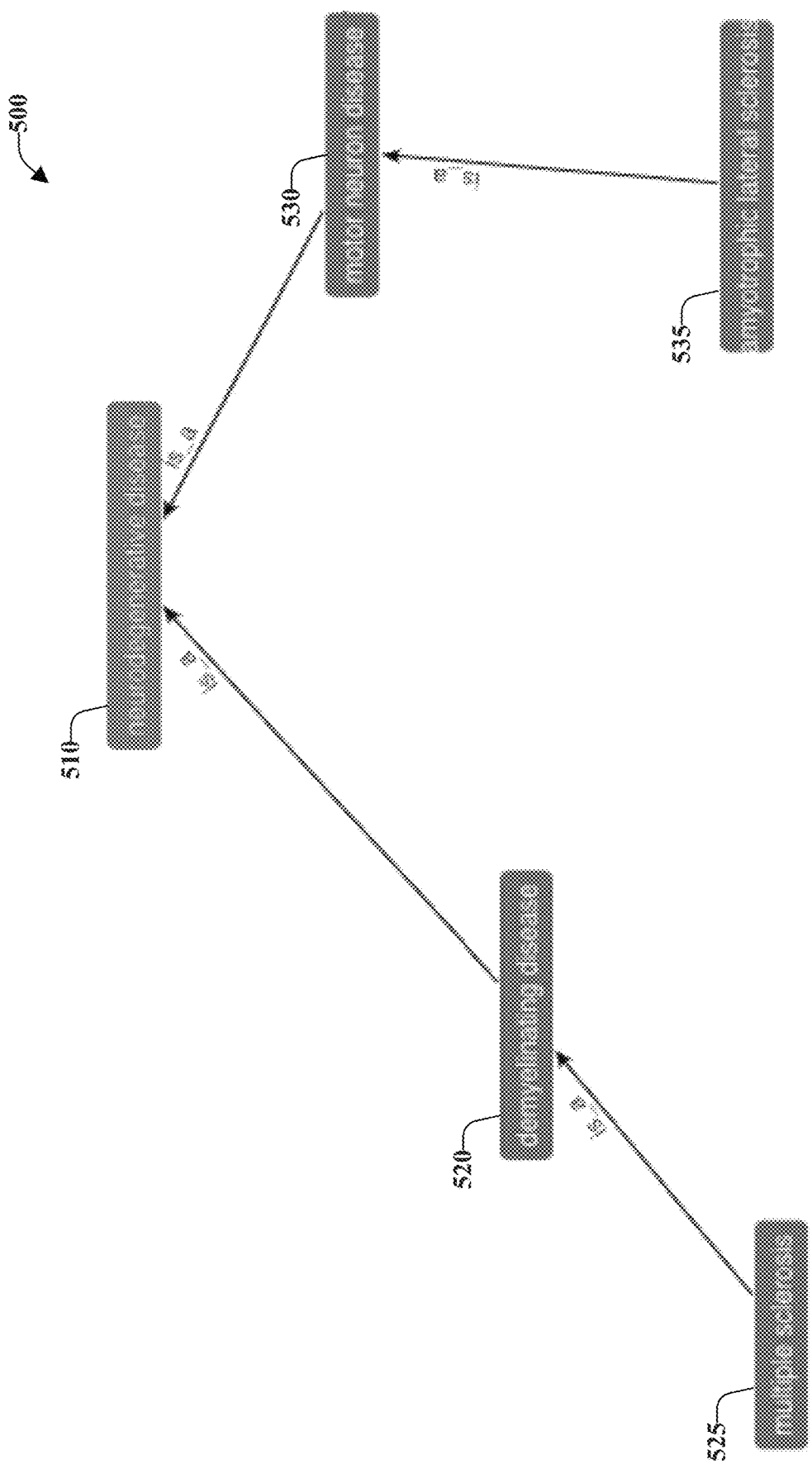
FIG. 5 is an example program data source ontology used for semantic enrichment in accordance with one or more embodiments described herein.

FIGS. 4 and 5 depict examples of how one or more embodiments can integrate semantic enrichment by both data science ontology 270 and program source data ontologies 280. FIG. 4 is an example semantic flow graph 400 of a program, that can be generated based on a data-science ontology in accordance with one or more embodiments described herein. FIG. 5 is an example program data source ontology that can be used for semantic enrichment of subjects identified in raw flow graph 340 in accordance with one or more embodiments described herein. Repetitive description of like elements employed in other embodiments described herein is omitted for sake of brevity.

Example semantic flow graph 400 can be based on an analysis of program instructions using, for example, data science ontology 270 to generate a conceptual flow of a program. In some embodiments, as shown in FIG. 4, semantic flow graph 400 can describe the program in terms of universal concepts which are independent of the particular programming language and libraries used to implement the program.

As is done herein, semantic flow graph 400 can be represented as a wiring diagrams having a set of interconnected objects, specifically boxes (e.g., file 410) and wires (e.g., file concept 415). In this example, the boxes of semantic flow graph 400 can represent abstract functions, or function concepts, and the wires can represent abstract types or type concepts, and respective observed elements. Semantic flow graph 400 can thus be viewed as an abstract function, composed of the concepts of the applicable ontology, written in the graphical syntax, and augmented with computed values.

For example, as depicted in flow graph 400, based on an analyzed raw flow graph, this program can yield boxes for semantic concepts: file 410, read-tabular-file 420, k-means 430, unknown concept 427, fit 440, clustering-model-clusters 450, and k-means-centroids 460. Also, abstract type concepts of semantic flow graph 400 are depicted and can include: file concept 415, table concept 425, k-means concept 435, array concept 437, k-means concepts 442 and 444, vector 455 and array 465.

In an example illustrated by FIGS. 4 and 5, the program operates on program source data describing amyotrophic lateral sclerosis (ALS) and multiple sclerosis (MS), both of these being neurodegenerative diseases. In this example, one or more embodiments can select one or more appropriate program source data ontologies, a portion of this ontology being shown in FIG. 5.

In the example semantic flow graph shown in FIG. 4, a clustering algorithm operates on data containing information about patients who suffer from ALS. The ontology associated with the data set contains general information about patients and the disease they suffer. For example, similar to the information presented in the disease ontology depicted in FIG. 5, in this example, the semantic flow graph of FIG. 4 depicts the processing of data that refers to patients who suffer from ALS, which is a motor neuron disease, this being a neurodegenerative disease. Similarly, in this example, when another instance of the same program operates on a dataset with patients suffering from MS, the ontology selected can refer to patients that suffer from a demyelinating disease, which is also a type of neurodegenerative disease. Alternatively, instead of separate ontologies for MS and ALS, a source data ontology can be used that refers more broadly to neurodegenerative diseases or even broader to neurological diseases. It should be appreciated that when multiple ontologies are described herein, the combinations of ontology data can be stored and used in any combination of one or more ontologies.

FIG. 5 shows an example of a portion of a program source data ontology that can be used with the examples discussed herein, and that includes neurodegenerative disease 510 as the top node, followed by demyelinating disease 520 and motor neuron disease 530 at the next level of nodes. Relevant to the examples discussed above, the next level of nodes contains multiple sclerosis 525 and amyotrophic lateral sclerosis 535.

The example of FIG. 5 illustrates the relationship between concepts in program source data that can be identified by one or more embodiments described herein. In an example linkage between semantic flow graph 400 and the program source data ontology of FIG. 5, in FIG. 4, clustering-model-clusters 450 (performed on results of the fit 440 operation on table 425, e.g., a table of ALS data) can be linked to ALS 535 concept in FIG. 5. Such a linkage could be used by one or more embodiments to identify the manipulation by the program of neurodegenerative disease data generally, and can further identify the potential use of the program in the manipulation of specific types of neurodegenerative disease, e.g., MS 525 data related to ALS 535 data. This example illustrates that one or more embodiments described herein can be used to identify conceptual relationships between different program source data sets manipulated by programs.

In addition to the use of the above-noted subject matter ontologies used by one or more embodiments to handle program source data, one or more data science ontologies can be applied to the type of results generated by a program task. For example, using semantic flow graph 400, one or more embodiments can identify metrics used to assess the quality of the algorithms used to process ALS and MS data (e.g., accuracy, exact match, or F1 measure), and the outcome of the processing algorithms (e.g., binary/continuous outcome variable).

Figure 6:
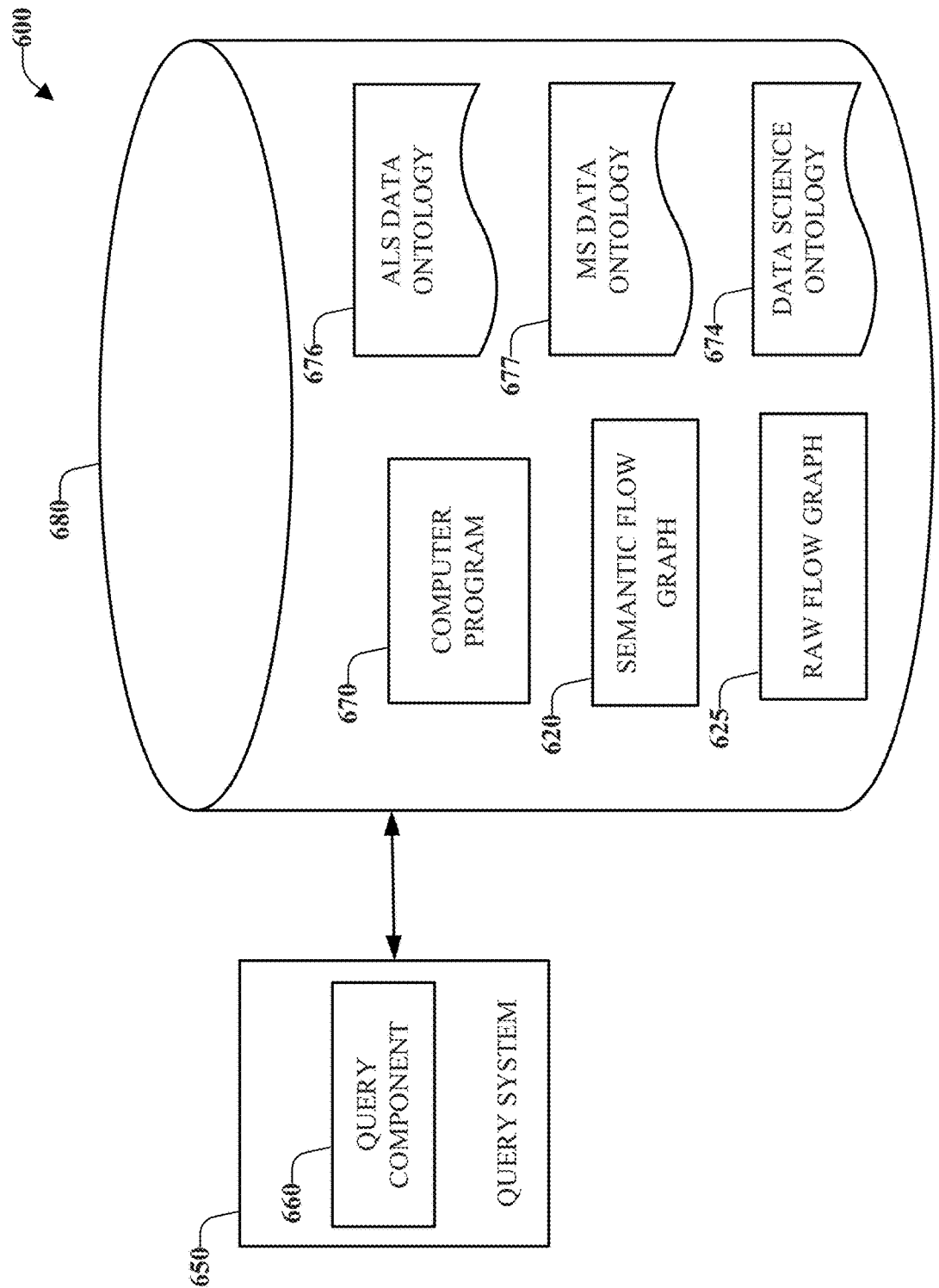
FIG. 6 illustrates a block diagram of an example, non-limiting system facilitating querying a semantic flow graph of a computer program based on a data science and a program data source ontology in accordance with one or more embodiments described herein.

FIG. 6 illustrates a block diagram of an example, non-limiting system architecture 600 of a semantic query system 650 that can generate and perform semantic queries of query data store 680 having linked data sources including one or more of, as depicted: computer program 670, raw flow graph 625, ALS data ontology 676, MS data ontology 677, data science ontology 674, and semantic flow graph 620. It should be noted that, as described above, of the data sources stored in query data store 680, semantic flow graph 620 is generated by a combination the other stored elements. In one or more embodiments, the enhanced flow data stored in semantic flow graph 620 can be cross referenced to other stored data sources, e.g., to provide extra detail in the results of querying semantic graph 620. Repetitive description of like elements employed in other embodiments described herein is omitted for sake of brevity.

In one or more embodiments, semantic flow graph 620, enriched with conceptual information (e.g., the ontologies discussed herein), can support a series of queries that refer to the type of data and/or the type of algorithms used by computer program 670. To illustrate different aspects of the operation of query system 650, a series of example query questions Q1-Q10 are included for discussion below. These questions relate to the examples of FIGS. 4 and 5 above, where both MS and ALS data are subject to different types of analysis by a computer program (e.g., computer program 670).

As listed below, Q1-Q5 are example semantic queries that can be performed by one or more embodiments. These example queries are about ALS and based on the requirements of real ALS-related applications, such as the ALS DREAM Challenges application. The basic structure of these queries includes a query command term (e.g., "find"), a conceptual statistical operation (e.g., "k-means analysis")

and one or more sources of data (e.g., "on ALS data"). Semantic queries Q1-Q5 are listed and commented on below:

Q1. "Find k-means analyses on ALS data."

Q2. "Find k-means analyses on ALS data, including variations and generalizations (kernel k-means, k-medoids)."

Q3. "Find clustering analyses on ALS data."

Q4. "Find clustering analyses in domain of neurodegenerative disease (ALS, MS, etc.)."

Q5. "Find survival analyses (e.g. Cox model) on MS data."

As further listed below, Q6-Q8 are example semantic queries that can be performed by one or more embodiments. These example queries are about MS and based the requirements of real applications, such as the MS Accelerated Cure Program (ACP) whose repository has many different tables and kinds of data. As discussed above with FIG. 5, these queries Q6-Q8 can be identified by one or more embodiments as being related to queries Q1-Q5 because of the identified conceptual relationship between MS and ALS, e.g., in Q8 below (referring to "gene expression data in domain of neurodegenerative disease"). Semantic queries Q6-Q8 are listed and commented on below:

Q6. "Find clustering analyses that use disease stage feature (primary progressive, secondary progressive)."

Q7. "Find clustering analyses on any gene expression data."

Q8. "Find clustering analyses of gene expression data in domain of neurodegenerative disease."

As further listed below, Q9-Q15 are example semantic queries that are related to general questions, these questions flexibly applying to different types of analyses independent of the data provenance and type. Also, these semantic queries can reference data sources in different ontologies, e.g., both ALS and MS conceptual data. Semantic queries Q9-Q15 are listed and commented on below:

Q9. "Find time series models that capture seasonality, cyclic pattern/high variability."

Q10. "Find all prediction analyses with a binary/continuous outcome variable."

Q11. "Find all analyses for cross-sectional/longitudinal data."

Q12. "Find people who rank high in prediction analyses."

Q13. "Find common pre-processing (missing data, outliers, transformation of certain variables) involved in the medical records/gene expression data."

Q14. "Find clustering analyses that deal with small sample size."

Q15. "Find data that is both natural language text and longitudinal (or, find analyses combining NLP and time series methods)."

It should be noted that the descriptions of one or more embodiments in FIGS. 1-5 can facilitate accurate and high-performance results to queries similar to Q1-Q11 based on the querying of semantic flow graph 620. As described herein, one approach to searching and providing results based on a query is for semantic flow graph 620 to be analyzed and a subset of information identified that is responsive to the query elements. In another approach, a query component 660 can analyze the information stored in query data store 680 and determine a corpus of data analyses relating to at least one subject, i.e., cross reference a subject of program source data with different operations identified in semantic flow graph 620 as being performed on the subject. After this determination, one or more embodiments can return this corpus as results of the query or provide a summary of the corpus as results of the query.

In some embodiments, in addition to the use of ontologies in the generation of semantic flow graph 620 (e.g., enrichment of raw flow graph 625 using ALS data ontology 676, MS data ontology 677, and data science ontology 674), to respond to queries of semantic flow graph 620, query component 660 can use ontologies stored in query data store 680 to expand and enhance queries submitted. For example, for query Q7 above, the searched for term "gene expression data" can be conceptually expanded by one or more embodiments using ALS data ontology 676 and MS data ontology 677 at the time the query is processed. Because these ontologies were used to generate semantic flow graph 620, one or more embodiments can use these ontologies to improve the querying of semantic flow graph 620. One having skill in the relevant art(s), given the disclosure herein, would appreciate other applications of ontologies stored in query store 680 to improve queries submitted by query component 660.

Figure 7:
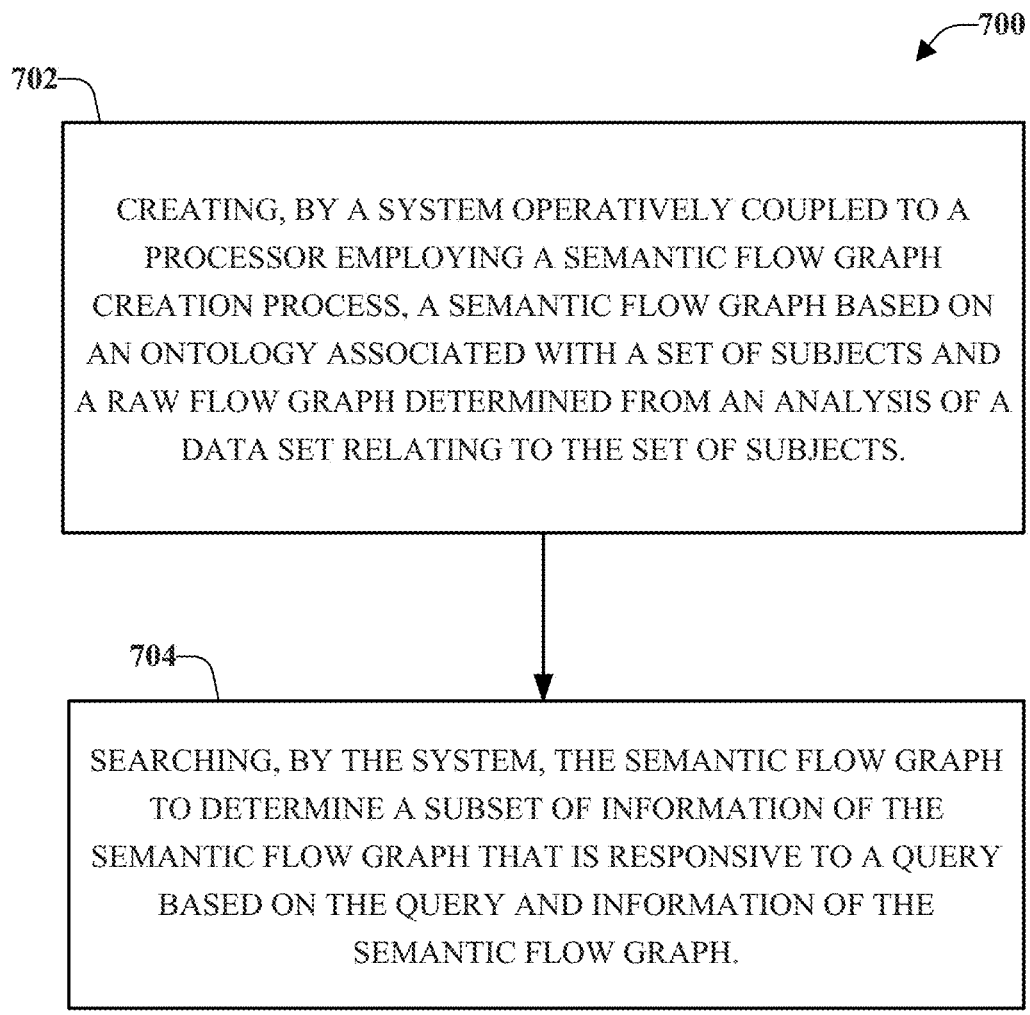
FIG. 7 illustrates a flow diagram of an example, non-limiting system facilitating creating a semantic flow graph and performing semantic queries of the semantic flow graph in accordance with one or more embodiments described herein.

FIG. 7 illustrates a flow diagram of an example, non-limiting computer-implemented method facilitating semantic queries of a semantic flow graph created based on a data science and a program data source ontology in accordance with one or more embodiments described herein. Repetitive description of like elements employed in other embodiments described herein is omitted for sake of brevity.

Figure 8:
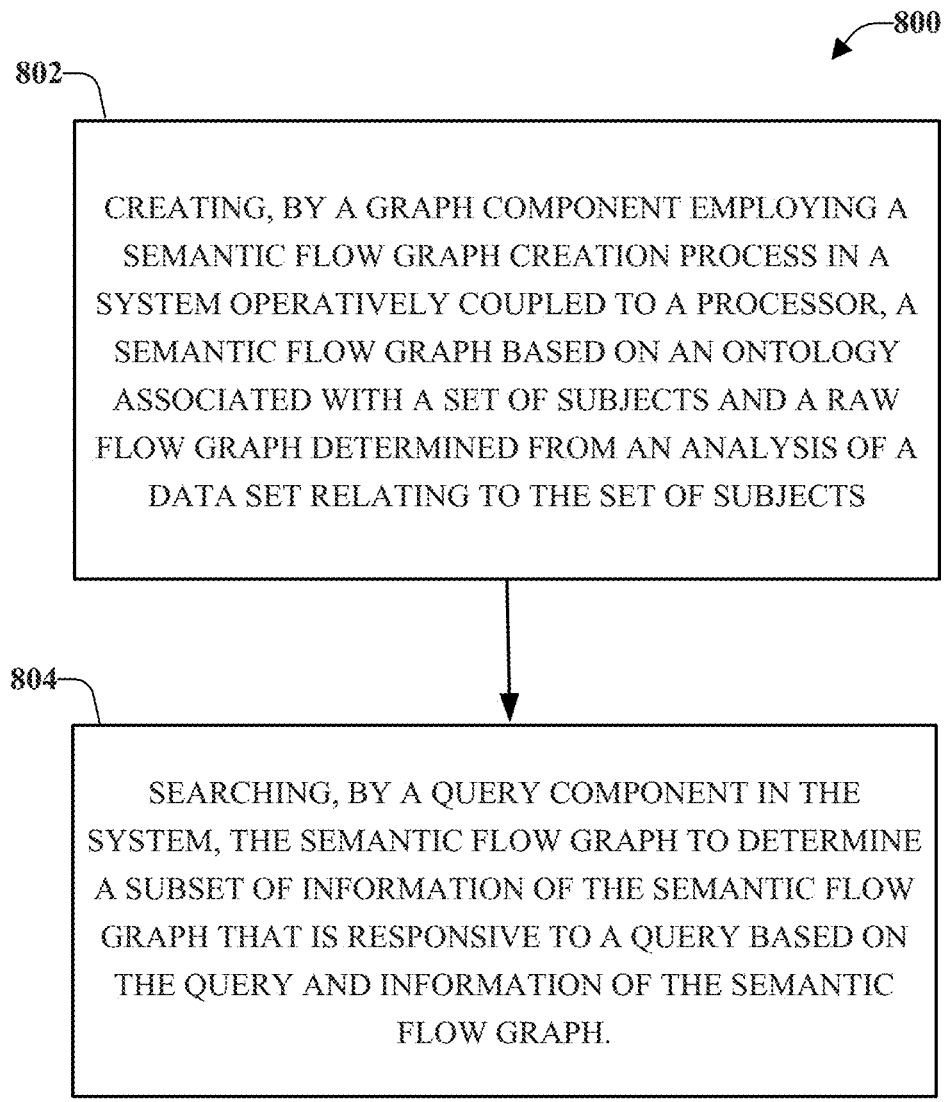
FIG. 8 illustrates a flow diagram of an example, non-limiting computer-implemented system having a graph component and a query component to facilitating creating a semantic flow graph and performing semantic queries of the semantic flow graph in accordance with one or more embodiments described herein.

FIG. 8 illustrates a flow diagram of an example, non-limiting computer-implemented system having a graph component and a query component to facilitate semantic queries of semantic flow graph created based on a data science and a program data source ontology in accordance with one or more embodiments described herein. Repetitive description of like elements employed in other embodiments described herein is omitted for sake of brevity.

Figure 9:
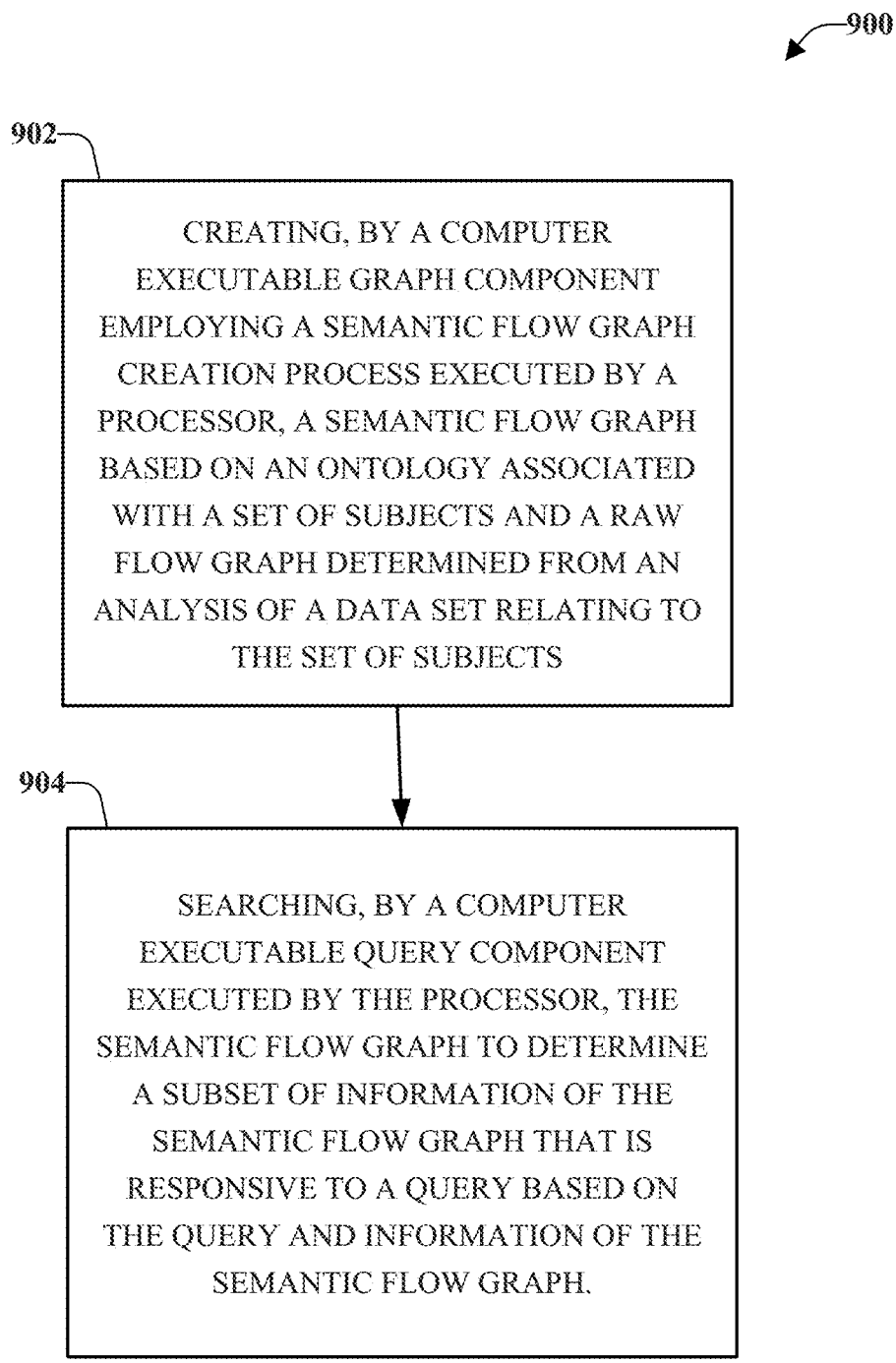
FIG. 9 illustrates a flow diagram of an example, non-limiting computer program product having instructions facilitating creating a semantic flow graph and performing semantic queries of the semantic flow graph in accordance with one or more embodiments described herein.

FIG. 9 illustrates a flow diagram of an example, non-limiting computer program product having instructions facilitating semantic queries of a semantic flow graph created based on a data science and a program data source ontology in accordance with one or more embodiments described herein. Repetitive description of like elements employed in other embodiments described herein is omitted for sake of brevity.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

One or more embodiments described herein can employ any suitable machine-learning based techniques, statistical-based techniques and/or probabilistic-based techniques. For example, the circuit rewriting component 110 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, one or more embodiments can perform a set of machine learning computations, such as the use of: clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 10:
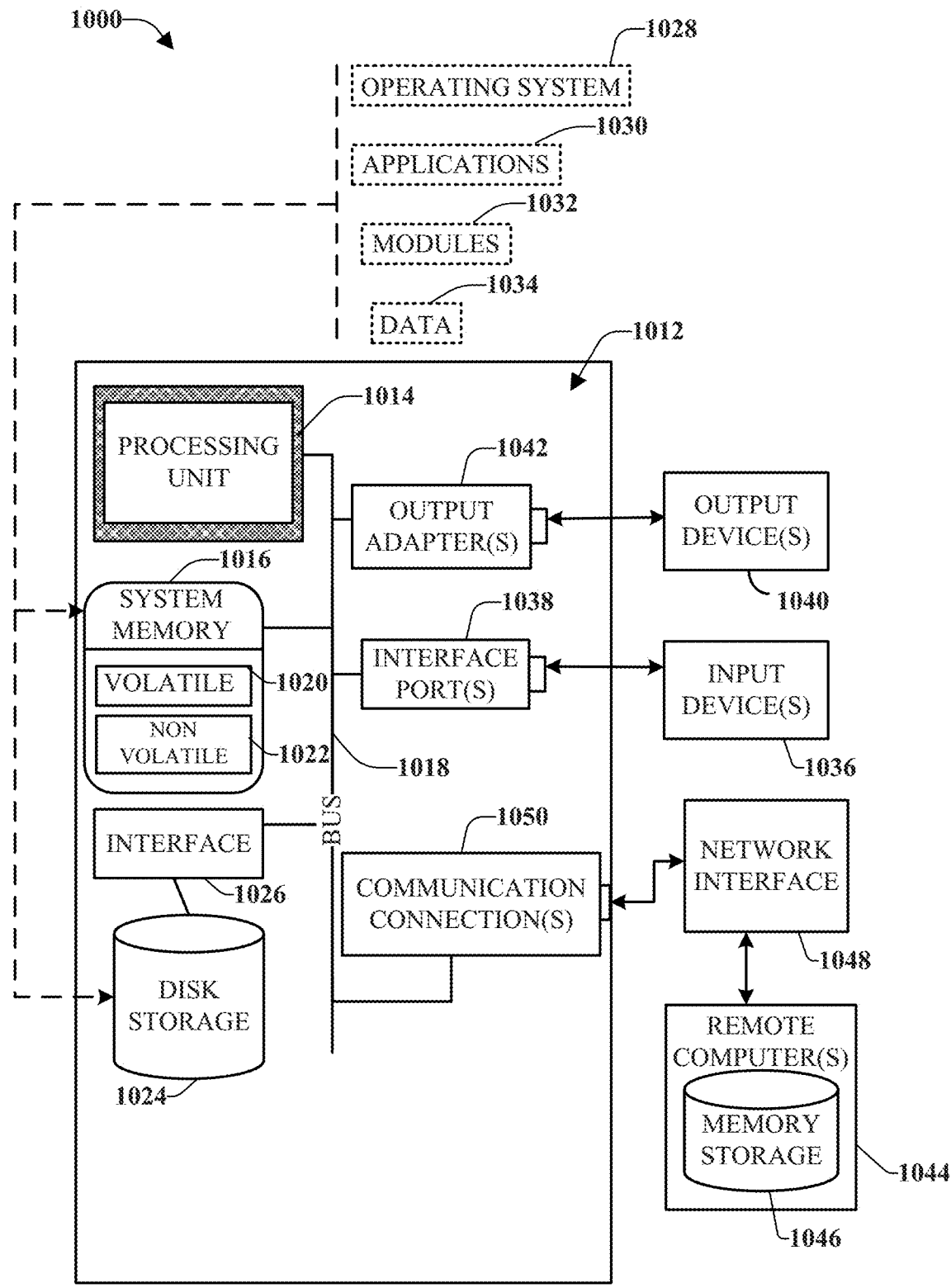
FIG. 10 illustrates a block diagram of an example, non-limiting operating environment in which one or more embodiments described herein can be facilitated.

FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 600. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the one or more embodiments.

Aspects of one more embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc.

that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor, operatively coupled to the memory, that executes the computer-executable components, the computer-executable components comprising:
      a graph component that:
         monitors, via the processor in real time, concrete function calls in one or more call stacks in the memory made by the computer program during execution of the computer program;
         identifies, via the processor in real time, concrete functions based on the concrete function calls in the one or more call stacks during the execution of the computer program, and concrete types employed by the concrete function calls,
         creates a raw flow graph based on a dataflow analysis of the concrete function calls, wherein the raw flow graph comprises nodes representing the concrete functions and edges representing the concrete types,
         selects a source data ontology graph, from a group of source data ontology graphs, that corresponds to a subject matter domain of the computer program, and
         transforms the raw flow graph into a semantic flow graph based on the source data ontology graph, comprising:
            transform the concrete functions of the nodes into abstract functions of the source data ontology graph, and
            transform the concrete types of the edges into abstract types of the source data ontology graph; and
      a query component that searches one or more semantic flow graphs to determine a subset of information of the one or more semantic flow graphs that is responsive to a query, wherein the one or more semantic flow graphs comprise the semantic flow graph.

2. The system of claim 1, wherein information of the semantic flow graph relates to a set of data analyses regarding the concrete functions.

3. The system of claim 2, wherein the subset of information of the one or more semantic flow graphs relates to a concrete function of the concrete functions, wherein the subset of information of the one or more semantic flow graphs comprises a portion of data of the set of data analyses, and wherein the query component determines that the portion of data of the set of data analyses is responsive to the query.

4. The system of claim 1, wherein the computer-executable components further comprise an ontology component that generates the source data ontology graph comprising concepts and annotations associated with the abstract functions, wherein the concepts of the abstract functions are determined from a data set relating to the abstract functions, wherein the concepts comprise a concept and the annotations comprise an annotation, wherein the annotation maps defined data of the data set to the concept, and wherein the annotation indicates a translation of a concrete function of the raw flow graph into an abstract function of the semantic flow graph.

5. The system of claim 4, wherein the source data ontology graph describes at least one data source and at least one type of data on which a defined algorithm relating to at least one abstract function of the set of abstract functions operates.

6. The system of claim 4, wherein the ontology component further:
   determines characteristics of a group of data, a type of data, and data domain information relating to a data analysis; and
   generates the source data ontology graph based on the characteristics, wherein the data domain information relates to a data domain.

7. The system of claim 1, wherein, in response to the query, the query component determines a summary of a corpus of data analyses relating to at least one abstract function of the set of abstract functions based on a result of the searching of the one or more semantic flow graphs, and wherein the subset of information of the one or more semantic flow graphs comprises the summary of the corpus of data analyses.

8. The system of claim 1, wherein, in response to the query, the query component determines a subset of data analyses that have a property in common based on a result of the searching of the one or more semantic flow graphs, and wherein the subset of information of the one or more semantic flow graphs comprises the subset of data analyses that have the property in common.

9. The system of claim 1, wherein the query is selected from a group of queries consisting of a first query that relates to a type of data, a second query that relates to a type of algorithm, and a third query that relates to the type of data and the type of algorithm.

10. The system of claim 1, wherein the graph component creates the semantic flow graph to be independent of a library employed to implement the computer program.

11. A computer-implemented method, comprising:
   monitoring, by a processor of a system, in real time, concrete function calls in one or more call stacks in a memory made by the computer program during execution of the computer program;
   identifying, by the processor, in real time, concrete functions based on the concrete function calls in the one or more call stacks during the execution of the computer program, and concrete types employed by the concrete function calls;
   creating, by the processor, a raw flow graph based on a dataflow analysis of the concrete function calls, wherein the raw flow graph comprises nodes representing the concrete functions and edges representing the concrete types;
   selecting, by the processor, a source data ontology graph, from a group of source data ontology graphs, that corresponds to a subject matter domain of the computer program;

transforming, by the processor, the raw flow graph into a semantic flow graph based on the source data ontology graph, comprising:
    transforming the concrete functions of the nodes into abstract functions of the source data ontology graph, and
    transforming the concrete types of the edges into abstract types of the source data ontology graph; and
searching, by the processor, one or more semantic flow graphs to determine a subset of information of the one or more semantic flow graphs that is responsive to a query, wherein the one or more semantic flow graphs comprise the semantic flow graph.

12. The computer-implemented method of claim 11, wherein information of the semantic flow graph relates to a set of data analyses regarding the concrete functions, wherein the subset of information of the one or more semantic flow graphs relates to at least one concrete function of the concrete functions and comprises a portion of data of the set of data analyses, and wherein the computer-implemented method further comprises, in response to the searching of the one or more semantic flow graphs, determining, by the processor, that the portion of data of the set of data analyses is responsive to the query.

13. The computer-implemented method of claim 11, further comprising:
    generating, by the processor, the source data ontology, wherein the source data ontology graph comprises concepts and annotations associated with the abstract functions, wherein the concepts of the abstract functions are determined from a data set relating to the abstract functions, wherein the concepts comprise a concept and the annotations comprise an annotation, wherein the annotation maps defined data of the data set to the concept, and wherein the annotation indicates a translation of a concrete function of the raw flow graph into an abstract function of the semantic flow graph.

14. The computer-implemented method of claim 13, further comprising:
    determining, by the processor, characteristics of a group of data, a type of data, and data domain information relating to a data analysis, wherein the generating of the source data ontology comprises generating the source data ontology graph based on the characteristics, and wherein the data domain information relates to a data domain.

15. The computer-implemented method of claim 11, further comprising:
    in response to the query, determining, by the processor, a summary of a group of data analyses relating to at least one abstract function of the set of abstract functions based on a result of the searching of the one or more semantic flow graphs, wherein the subset of information of the one or more semantic flow graphs comprises comprise the summary of the group of data analyses.

16. The computer-implemented method of claim 11, further comprising:
    in response to the query, determining, by the processor, a subset of data analyses that have a property in common based on a result of the searching of the one or more semantic flow graphs, comprising a set of data analyses, wherein the set of data analyses comprises the subset of data analyses, and wherein the subset of information of the one or more semantic flow graphs comprises the subset of data analyses that have the property in common.

17. The computer-implemented method of claim 11, wherein the semantic flow graph is created to be independent of a program and a library employed to implement the computer program.

18. The computer-implemented method of claim 11, wherein the query is selected from a group of queries consisting of a first query that relates to a type of data, a second query that relates to a type of algorithm, and a third query that relates to the type of data and the type of algorithm.

19. A computer program product that facilitates semantic querying, the computer program product comprising a computer readable storage medium having program instructions embodied therewith, the program instructions being executable by a processor to cause the processor to:
    monitor, by the processor, in real time, concrete function calls in one or more call stacks in a memory made by the computer program during execution of the computer program;
    identify, by the processor, in real time, concrete functions based on the concrete function calls in the one or more call stacks during the execution of the computer program, and concrete types employed by the concrete function calls;
    create, by the processor, a raw flow graph based on a dataflow analysis of the concrete function calls, wherein the raw flow graph comprises nodes representing the concrete functions and edges representing the concrete types;
    select, by the processor, a source data ontology graph, from a group of source data ontology graphs, that corresponds to a subject matter domain of the computer program;
    transform, by the processor, the raw flow graph into a semantic flow graph based on the source data ontology graph, comprising:
        transform the concrete functions of the nodes into abstract functions of the source data ontology graph, and
        transform the concrete types of the edges into abstract types of the source data ontology graph; and
    search, by the processor, one or more semantic flow graphs to determine a subset of information of the one or more semantic flow graphs that is responsive to a query, wherein the one or more semantic flow graphs comprise the semantic flow graph.

20. The computer program product of claim 19, wherein information of the semantic flow graph relates to a set of data analyses regarding the concrete functions, wherein the subset of information of the one or more semantic flow graphs relates to at least one concrete function of the concrete functions and comprises a portion of data of the set of data analyses, and wherein the program instructions are further executable by the processor to cause the processor to, in response to the search of the one or more semantic flow graphs, determine, by the processor, that the portion of data of the set of data analyses is responsive to the query.

* * * * *